US010422902B2

(12) United States Patent
Holman et al.

(10) Patent No.: US 10,422,902 B2
(45) Date of Patent: Sep. 24, 2019

(54) METHODS OF GENERATION OF FRACTURE DENSITY MAPS FROM SEISMIC DATA

(71) Applicant: THE BOARD OF REGENTS FOR OKLAHOMA STATE UNIVERSITY, Stillwater, OK (US)

(72) Inventors: Robert Holman, Edmond, OK (US); Priyank Jaiswal, Stillwater, OK (US)

(73) Assignee: THE BOARD OF REGENTS FOR OKLAHOMA STATE UNIVERSITY, Stillwater, OK (US)

(*) Notice: Subject to any disclaimer, the term of this patent is extended or adjusted under 35 U.S.C. 154(b) by 216 days.

(21) Appl. No.: 15/506,733

(22) PCT Filed: Sep. 3, 2015

(86) PCT No.: PCT/US2015/048399
§ 371 (c)(1),
(2) Date: Feb. 25, 2017

(87) PCT Pub. No.: WO2016/036979
PCT Pub. Date: Mar. 10, 2016

(65) Prior Publication Data
US 2017/0248719 A1     Aug. 31, 2017

Related U.S. Application Data

(60) Provisional application No. 62/045,307, filed on Sep. 3, 2014.

(51) Int. Cl.
*G01V 1/30*     (2006.01)
*G01V 1/28*     (2006.01)
(Continued)

(52) U.S. Cl.
CPC .............. *G01V 1/306* (2013.01); *E21B 7/046* (2013.01); *E21B 49/003* (2013.01); *G01V 1/28* (2013.01);
(Continued)

(58) Field of Classification Search
CPC ....... E21B 7/046; E21B 49/003; G01V 1/306; G01V 1/28; G01V 1/303; G01V 1/307
See application file for complete search history.

(56) References Cited

U.S. PATENT DOCUMENTS

2003/0009289 A1* 1/2003 West ........................ G01V 1/30
                                                                 702/14
2010/0017449 A1    1/2010 Meinds
(Continued)

FOREIGN PATENT DOCUMENTS

AU         2007200302 A1     8/2007

OTHER PUBLICATIONS

Holman, "Seismic Characterization of Fractured Rock Fabric in Mississippian Limestone, Payne County Oklahoma," Master Thesis submitted to Oklahoma State University, Aug. 2014.*

(Continued)

*Primary Examiner* — Mohamed Charioui
*Assistant Examiner* — Catherine T. Rastovski
(74) *Attorney, Agent, or Firm* — Crowe & Dunlevy, P.C.; Terry L. Watt

(57) ABSTRACT

A method is herein presented to statistically combine multiple seismic attributes for generating a map of the spatial density of fractures. According to an embodiment a first step involves interpreting the formation of interest in 3D seismic volume first to create its time structure map. The second step is creating depth structure of the formation of interest from its time structure map. In this application geostatistical methods have been used for depth conversional, although (Continued)

other methods could be used instead. The third step is extraction of a number of attributes, such as phase, frequency and amplitudes, from the time structure map. The next step is to project the fracture density onto the top of the target formation. The final step is to combine these attributes using a statistical method known as Multi-variant non-linear regression to predict fracture density.

11 Claims, 5 Drawing Sheets

(51) Int. Cl.
*G01V 11/00* (2006.01)
*E21B 7/04* (2006.01)
*E21B 49/00* (2006.01)

(52) U.S. Cl.
CPC .............. *G01V 1/303* (2013.01); *G01V 1/307* (2013.01); *G01V 11/00* (2013.01); *G01V 2210/6224* (2013.01); *G01V 2210/646* (2013.01); *G01V 2210/665* (2013.01); *G01V 2210/6652* (2013.01)

(56) References Cited

U.S. PATENT DOCUMENTS

| | | |
|---|---|---|
| 2010/0312529 A1 | 12/2010 | Souche et al. |
| 2011/0120702 A1* | 5/2011 | Craig ...................... E21B 43/26 166/250.1 |
| 2013/0079935 A1 | 3/2013 | Kabannik et al. |
| 2015/0066460 A1* | 3/2015 | Klinger ............... G06F 17/5018 703/2 |
| 2015/0219779 A1* | 8/2015 | Deng ..................... G01V 1/345 702/16 |
| 2016/0061976 A1* | 3/2016 | Hu .......................... G01V 1/48 367/7 |

OTHER PUBLICATIONS

Staples, "Subsurface and Experimental Analyses of Fractures and Curvature", Thesis submitted to University of Oklahoma, 2011.*
White, "Fracturing of Mississippi Lime, Oklahoma: Experimental, Seismic Attributes and Image Logs Analyses", Thesis submitted to University of Oklahoma, 2013.*
Aarre, et al., "Seismic Detection of Subtle Faults and Fractures", 2012, pp. 3043, vol. 24, No. 2, Published in: US.
PCT/US2015/048399, International Search Report and Written Opinion, dated Dec. 7, 2015.

* cited by examiner

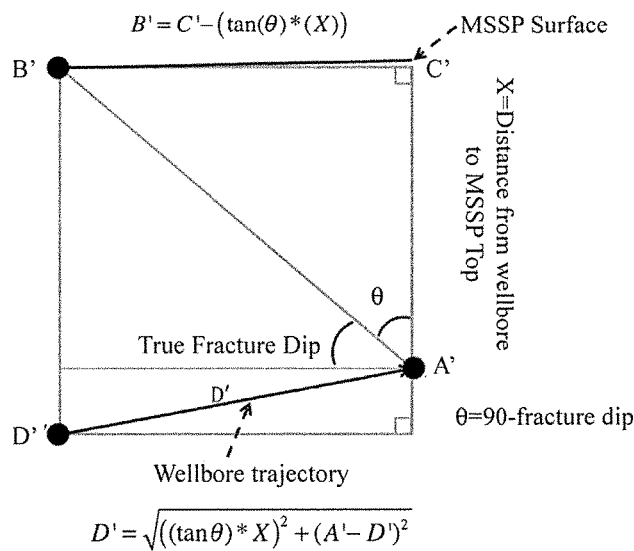
Figure 5
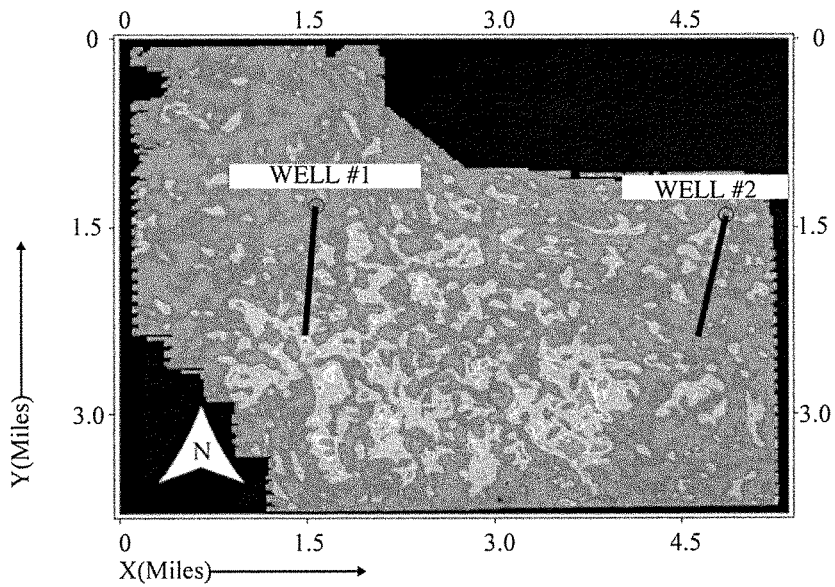
Figure 7
Figure 8

What is A'B' in terms of AB?

METHODS OF GENERATION OF FRACTURE DENSITY MAPS FROM SEISMIC DATA

CROSS REFERENCE TO RELATED APPLICATIONS

This application claims the benefit of U.S. Provisional Patent Application Ser. No. 62/045,307 filed on Sep. 3, 2014, and incorporates said provisional application by reference into this document as if fully set out at this point.

TECHNICAL FIELD

This disclosure relates generally to the field of seismic imaging of the subsurface and, more specifically, to systems and methods of fracture density estimation of rock units in the subsurface using seismic data.

BACKGROUND

Fractures are pre-existing planes of weaknesses in rock units. They play a critical role in determining, for example, the production potential of reservoirs that are developed through lateral/horizontal drilling and hydraulic fracturing ("fracking"). As a specific example, knowledge of fracture orientation and/or extent is key to production in formations such as the Mid-Continent Mississippian Limestone. Rock fractures contribute to porosity and, if they are open, have the potential to contribute substantially to the permeability of a formation. Obviously, permeability in producing formations is necessary and highly desirable as it provides a pathway for oil to be pushed or drawn to the borehole so that it can be extracted. Similarly, where there is knowledge or an estimate of where a reservoir is fractured internally is an important consideration in the process of selecting a drill site for exploration or production purposes.

Estimation of spatial fracture density using geophysical methods, such as seismic, is highly desirable but extremely challenging theoretically and in practice. Attributes of seismic data such as amplitudes, phase and frequency originate from a complex interaction between the propagating seismic wavefield and the rocks and fluids the waves encounters along their path. Individual rock properties such as fracture density, mineralogy, porosity, permeability and fluid saturation type have varying degree of influence on individual seismic attributes. Thus, a single seismic attribute cannot be uniquely related to any particular rock property.

Of course, seismic data interrogates the subsurface of the earth without drilling and, to the extent such could be used to estimate fracture density, such knowledge could be influential in the decision as to whether and where to drill. Additionally, knowledge of the distribution and orientation of exiting fractures would be useful in planning hydraulic fracking operations, offset wells in producing formations, injection wells, etc.

Thus, what is needed is a methodology for estimating subsurface fracture density using seismic that is not subject to the disadvantages of prior art approaches.

Before proceeding to a description of the present invention, however, it should be noted and remembered that the description of the invention which follows, together with the accompanying drawings, should not be construed as limiting the invention to the examples (or embodiments) shown and described. This is so because those skilled in the art to which the invention pertains will be able to devise other forms of this invention within the ambit of the appended claims.

SUMMARY OF THE INVENTION

According to an embodiment, a method is presented herein wherein multiple seismic attributes are combined such that the fracture density can be estimated discounting for all the other rock properties.

Naturally existing fractures are critical to development of unconventional reservoirs. No method is presently known to be available to reliably predict fracture density using seismic data. Through a multi-step workflow described herein, an embodiment statistically combines attributes of seismic data, such as amplitude, frequency, coherency and curvature, to generate a fracture density map. As one example, when the instant method was used to predict and the prediction was compared with actual fracture densities along a well bore, the prediction error proximate to the well bore using an embodiment proved to be less than 5%.

In one embodiment as an initial step, a target formation of interest will be identified on seismic data, e.g., by using a 2D seismic line or 3D seismic volume, and within at least one horizontally drilled well. The reflector(s) associated with the formation will be picked and associated with surface locations to create a time structure map.

Next, a depth structure of the formation of interest will be created from its time structure map. In one example, geostatistical methods were used to create a velocity profile for use in the depth conversion. The depth structure will be chosen to be aligned in depth with the target formation where it is proximate to the well.

A third step in this embodiment is extraction of a number of attributes, such as phase, frequency and amplitudes, from the seismic data in time structure map.

Continuing with the present example, a next step would be to use these attributes to predict fracture density using a statistical method known as multi-variant non-linear regression to predict fracture density.

According to an embodiment there is taught herein a method of seismic exploration of a region of the subsurface of the earth containing structural or stratigraphic features conducive to the presence, migration, or accumulation of hydrocarbons, wherein is provided a plurality of seismic traces collected in a seismic survey conducted proximate to the region of the subsurface of the earth and at least one FMI well log obtained from a horizontally drilled well proximate to said seismic survey, at least a portion of said FMI well log being within a target formation, said target formation having a top defined by a plurality of depths within the subsurface, the method comprising the steps of: within a computer, obtaining a plurality of fracture density measurements from said FMI log, thereby producing a fracture density log; accessing said plurality of seismic traces from said seismic survey; identifying said target formation top within each of said accessed plurality of seismic traces, thereby producing a picked time within each of said accessed plurality of seismic traces; using said picked time associated with each of said accessed plurality of seismic traces and said plurality of depths defining said target formation to adjust said picked time of said each of said seismic traces to match a corresponding depth of said formation top; projecting said at least a portion of said fracture density log onto said formation top along a fracture dip direction, thereby obtaining formation density estimates along said formation top; calculating a plurality of different seismic attributes for each of said accessed plurality of seismic traces from seismic data proximate in depth to said target formation top; using said calculated plurality of different seismic attributes for each of said accessed plurality of seismic traces and said formation density estimates along said formation top to obtain a prediction equation that relates said plurality of seismic attributes to said fracture density estimates along said formation top; and, using said prediction equation and at least a portion of said seismic survey to predict fracture density away from said horizontally drilled well; making an exploration or production decision based on said predicted fracture density away from said horizontally drilled well.

According to another embodiment there is provided a method of exploration of a region of the subsurface of the earth, wherein is provided a plurality of seismic traces collected in a seismic survey conducted proximate to the region of the subsurface of the earth and a fracture density log obtained from a horizontally drilled well proximate to said seismic survey, at least a portion of said fracture density log being within a target formation, said target formation having a top defined by a plurality of depths within the subsurface, the method comprising the steps of: within a computer, accessing said fracture density log; accessing said plurality of seismic traces from said seismic survey; identifying said target formation top within each of said accessed plurality of seismic traces, thereby producing a picked time associated with each of said accessed plurality of seismic traces; using said picked time associated with each of said accessed plurality of seismic traces and said plurality of depths defining said target formation to adjust said picked time of said each of said seismic traces to match a corresponding depth of said formation top; projecting said at least a portion of said fracture density log onto said formation top along a fracture dip direction, thereby obtaining formation density estimates along said formation top; calculating a plurality of different seismic attributes from said depth adjusted seismic data; using said calculated plurality of different seismic attributes for each of said accessed plurality of seismic traces and said formation density estimates along said formation top to obtain a prediction equation that relates said plurality of seismic attributes to said fracture density estimates along said formation top; and, using said prediction equation and at least a portion of said seismic survey to predict fracture density away from said horizontally drilled well; making an exploration or production decision based on said predicted fracture density away from said horizontally drilled well; and, drilling a well based on said exploration or production decision.

The foregoing has outlined in broad terms some of the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

These and further aspects of the invention are described in detail in the following examples and accompanying drawings.

FIG. 5 contains an example of a dip projection according to an embodiment. Fracture density is projected to the Mississippian top along the fracture dip. A'D' is the well trajectory. A'B' is the fracture dip. This embodiment assumes that a) fracture dip remains consistent within the Mississippian formation, b) the overall wellbore trajectory comprises multiple flat intervals and c) maximum fracture dip is in the plane of projection.

FIG. 7 contains an example correlation table for seismic attributes obtained according to an embodiment.

FIG. 8 contains an illustration of a predicted fracture density map calculated according to an embodiment.

DETAILED DESCRIPTION

Figure 1:
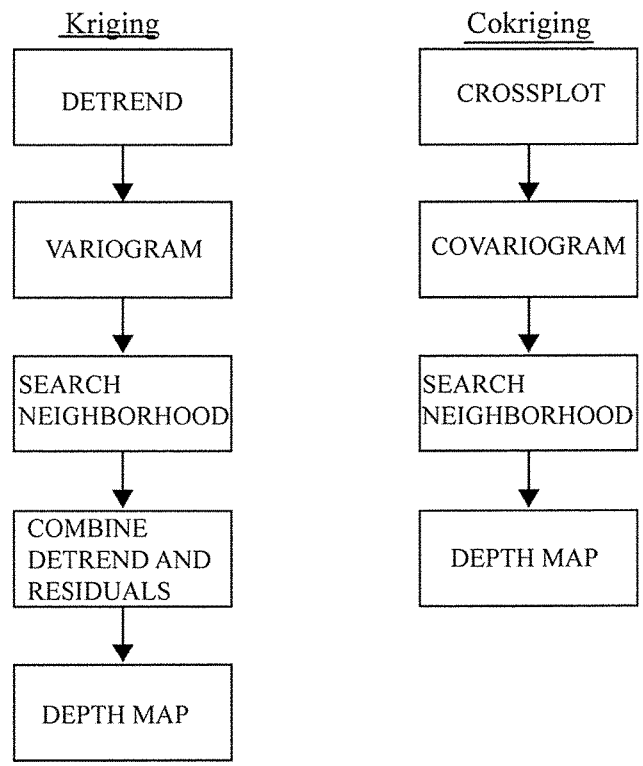
FIG. 1 contains kriging and cokriging flow charts which illustrate some variations of an operating logic suitable for use with an embodiment.

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

According to an embodiment, there is presented herein a method wherein multiple seismic attributes are combined and used to estimate fracture density.

By way of a summary example only of fracture density estimation, according to an embodiment, first a target formation, reflector, etc., is identified (e.g., picked) in a 2D line or grid, or a 3D seismic volume. Following this, the picked target formation will be converted from time to depth. Although processing velocities could be used for this step if available, in some embodiments a geostatistical method will be used to create the depth structure map based on well log velocities. Of course, those of ordinary skill in the art will recognize that converting to depth is not absolutely required since the well log depths could alternatively be converted to time in order to match the seismic. As such, given the well known interchangeability of time and depth with respect to seismic data when it is said that the seismic data is converted to depth to match the well or a depth-defined formation, that statement should be understood to mean that the seismic and formation/well data are converted to a common domain so that corresponding data can be matched.

Following this, parts of the seismic volume which were inadequately processed are identified, e.g., by comparing synthetic seismogram based on well logs from nearby wells with the actual seismic data. Of course, attributes extracted from seismic data that has not been adequately processed carries with it the risk of not representing the actual rock properties. As such, properly processed and imaged seismic data is preferred.

Next, and in some embodiments, seismic attributes such as amplitude, phase, frequency, coherency and curvature are extracted from the most reliable parts of the seismic volume. In some cases, this could correspond to the seismic data that best fits calculated synthetic seismograms. In other cases, the seismic data chosen might be the, for example, traces that exhibit the best signal-to-noise ratio at the target reflector or depth, have the most reliable velocities, show the most trace-to-trace coherency, etc.

Following this, the extracted seismic attributes will be combined using non-linear regression to generate a fracture density map. This aspect is discussed in greater detail below.

Next, the seismically predicted fracture density map can be superimposed on the depth structure map in order to verify the accuracy of the prediction at least where the predicted map overlays well data. Where one or more of the wells that is used as ground truth are laterally drilled (horizontally drilled)

Finally, fracture densities interpreted in the lateral wells using the FMI (formation micro imager) logs can be projected to/matched with the top depth surface of a target formation. This sort of information allows the seismic predictions to be validated at the well.

Figure 6:
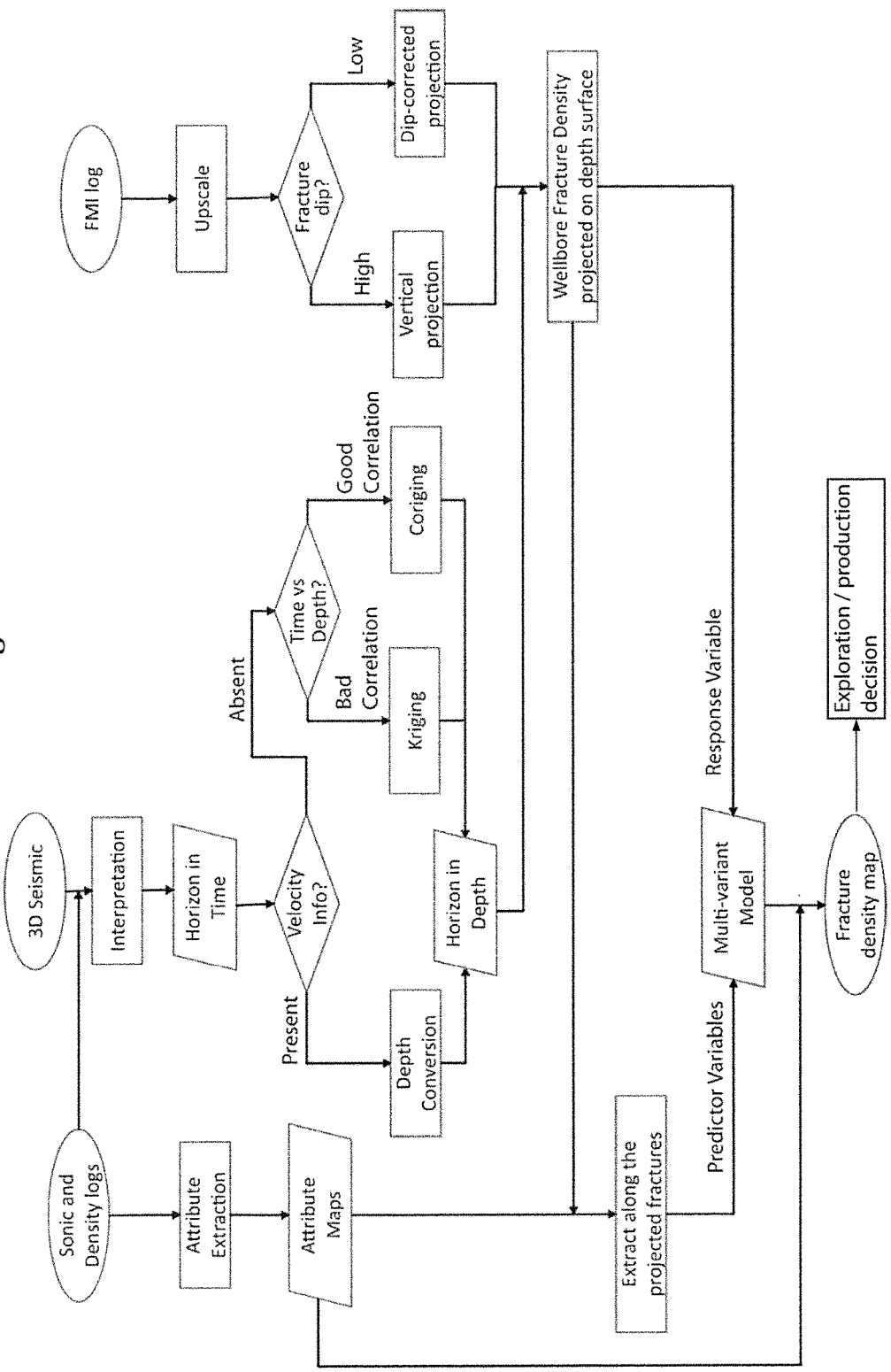
FIG. 6 contains an operating logic suitable for use with an embodiment.

Now turning to a description of an embodiment in more detail and as set out in FIG. 6, as a first step a seismic data set will be acquired. Although it is preferably a 3D seismic data set, a grid of 2D seismic data, or even a single seismic line might be acquired. The ultimate goal is to use the seismic data to predict fracture density away from the one or more wells, thereby enabling exploration or production decisions to be made away from well control based on the values of that parameter. The seismic data will be processed and interpreted according to methods well known to those of ordinary skill in the art. In some cases, velocity and/or density data from well logs proximate to the survey will be used to adjust Continuing with FIG. 6, an embodiment utilizes sonic and/or density logs as input to the processing and interpretation process. Those of ordinary skill in the art will recognize that velocity data (from sonic logs) could be used to augment more conventionally calculated velocity estimates from seismic data and density information from density logs could be used in conjunction with the sonic log to compute synthetic seismograms to assist in tying well and seismic data. These and other well logs can also be used to assist in locating the target rock unit in the subsurface.

Next, the seismic data will be interpreted and the waveform(s) associated with the target horizon identified. In some cases this will be done by picking the target reflector(s) on a computer display using specialized software according to methods well known to those of ordinary skill in the art. In some cases, the target horizon might be picked on paper sections but, for 3D data, the most efficient way to trace a horizon through a volume would be to do that using a PC or specialized interpretation workstation. This end result of this process will be identification of the target horizon in time throughout the seismic dataset. Of course, if the seismic data has been depth migrated or otherwise converted to depth before interpretation the target horizon will already be in depth and, in that case, assuming that the depths are acceptable, the method could proceed to the step of associating the FMI (fracture micro-imaging) log data from the target horizon with seismic attributes described below.

Assuming that the seismic picks were in time, it is expected that a next step would be to convert the picks from time to depth according to methods well known to those of ordinary skill in the art. However, one method that has worked well for some embodiments would be to use velocities calculated from seismic data (e.g., stacking velocities, vertical seismic profile velocities) to do the depth conversion.

In other cases, for example where seismic stacking velocities are absent or unreliable, the time to depth conversion might be done using well log data. Of course, log data is only available at a well and seismic data typically will cover an area that includes the vicinity of the well and much more. In such a case, well velocities might be extrapolated or interpolated (if multiple wells are available) to create a velocity (or depth, etc.) map using geostatistical methods such as Kriging or Cokriging. That being said, the particular method of interpolation/extrapolation does not matter and those of ordinary skill in the art will readily be able to find and use alternative methods. All that is required is that, whatever method is used, it must be able to provide parameter estimates away from the well(s) and at points where the seismic reflectivity data exists.

FIG. 1 contains Kriging and Cokriging flow charts that provide an operating logic suitable for use with an embodiments. Kriging and cokriging are well known geostatistical methods of data interpolation and extrapolation. In Kriging data is interpolated between sampled locations based on data variability between sample pairs. In Cokriging data interpolation uses the secondary variable for interpolation beyond the range depending on the sampling frequency of a secondary variable. The fidelity of Cokriging depends on how well the primary and secondly variable are related. In some embodiments, Cokriging would be preferred, e.g., when there is a good time-to-depth correlation/conversion. Otherwise, Kriging might be used. The steps illustrated in FIG. 1 will be discussed in greater detail below.

Given velocity estimates at each seismic trace of interest, the target horizon will be converted to depth using the velocities, e.g., velocities supplied from the well, according to an embodiment using methods well known to those of ordinary skill in the art. The seismic data are now ready to be utilized in conjunction with the FMI log data.

With respect to the FMI log data, an FMI log is a high resolution resistivity log that provides data measurements every few inches. It is generically referred to as a microresistivity log which are typically used in place of, or as an adjunct to, the older dipmeter logs.

A FMI logging device typically contains some number of electrode contact points that are spaced around the perimeter of the borehole that are placed into contact with the formation. A voltage applied to the electrodes causes an alternating current to flow from each lower electrode into the formation which is then sensed via a return electrode on the upper part of the tool. This provides very high resolution measurements of the changing resistivity along the path of the tool, which resistivity can then be correlated with fracture density via methods well known to those of ordinary skill in the art. Note that "FMI" is claimed as a trademark of the Schlumberger Corporation but that acronym will be used herein as a generic descriptor of a microresistivity log or any other similar log that can be used to give a quantitative measure of down hole fracture density.

Continuing with the example of FIG. 6, the FMI data will need to be upscaled to make the fracture density data commensurate with the seismic data. That is, the depth difference between successive seismic samples tends to be multiple feet or tens of feet depending on the formation and the sample rate. On the other hand, fracture density might be measured, for example, as the number of observed fractures per inch. These data will need to be adjusted to the scale that can be imaged by seismic data. In some embodiments, the resulting resolution might be chosen based on the dominant frequency of the seismic data, e.g., to about ¼ wavelength of the dominant frequency. For example, if the dominant frequency is 50 Hz and the velocity is about 10,000 feet per second, the FMI data might be upscaled to ¼ of the wavelength of the seismic, possibly adjusted by some percentage (e.g., .+−.10% to .+−.15%). In this example, each wavelength would be 200 feet long and, thus, the FMI data would be upscaled to a 50 foot interval.

Figure 2:
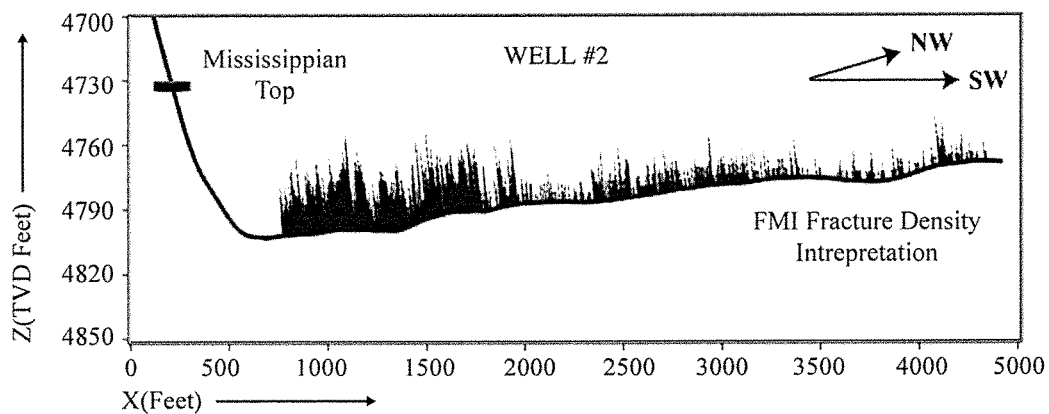
FIG. 2 illustrates an actual fracture density curvy that has been calculated from a FMI log. Fracture density is superimposed on the trajectory of a horizontally drilled well. In this particular example, the heel of the wellbore has higher fracture density than its toe.

Next, it would be ideal to extract seismic attributes from samples that follow along the actual path in those instances where the well is horizontal/laterally drilled. However, with current seismic interpretation technology, this may not generally be possible. Therefore, model validation of the estimated fracture density along a wellbore will be projected onto the top surface of the target horizon where the attributes have been mapped. This might be for many reasons but one reason to do this is that the top of the formation can usually most easily be identified and pick on the seismic data, whereas the well path might vary vertically within the target formation, i.e., it might be near the top, the bottom, or the middle. FIG. 2 contains one such example. As such, it is important that the measured well properties be closely matched with the seismic data that interact with these properties. Since a well path cannot be identified on conventional seismic, and in some cases the seismic might even have been collected before the well was drilled, instead an embodiment projects the measured well properties onto a surface that can be identified within the seismic data.

Where the well path is roughly horizontal and the top of the target formation is horizontal as well, in some cases it might be enough to simply assume that the fracture density measured within applies as well to the top of the formation. However, that is rarely the case and even if it might be true for small sections of the well it would rarely be true for the entire length of the well. Thus, in case the fracture dips do not allow accurate vertical projection, a dip-corrected method (FIG. 5) can be used. In this embodiment, the dip-corrected projection method assumes that (a) the fracture dips remain relatively constant between the well and the top of the target formation, i.e., no mechanical bending occurs at internal sequences of the play; and, (b) the maximum fracture dip is in the plane of projection. Like the fracture density information, the fracture dip information can also be obtained from the FMI logs.

With respect to FIG. 5, the wellbore trajectory (dip with respect to the horizontal) at a point can readily be obtained from the FMI log according to methods well known to those of ordinary skill in the art. Additionally, it will be assumed for purpose of the instant example that the wellbore trajectory comprises multiple linear segments. In this figure, A'D' is the well trajectory, A'B' is the fracture dip, X is vertical distance between the top of the target formation (Mississippian in the current example) and the point A' in the well bore, horizontal distances between the points, and $\theta$ is the fracture dip as measured within the well.

Figure 9:
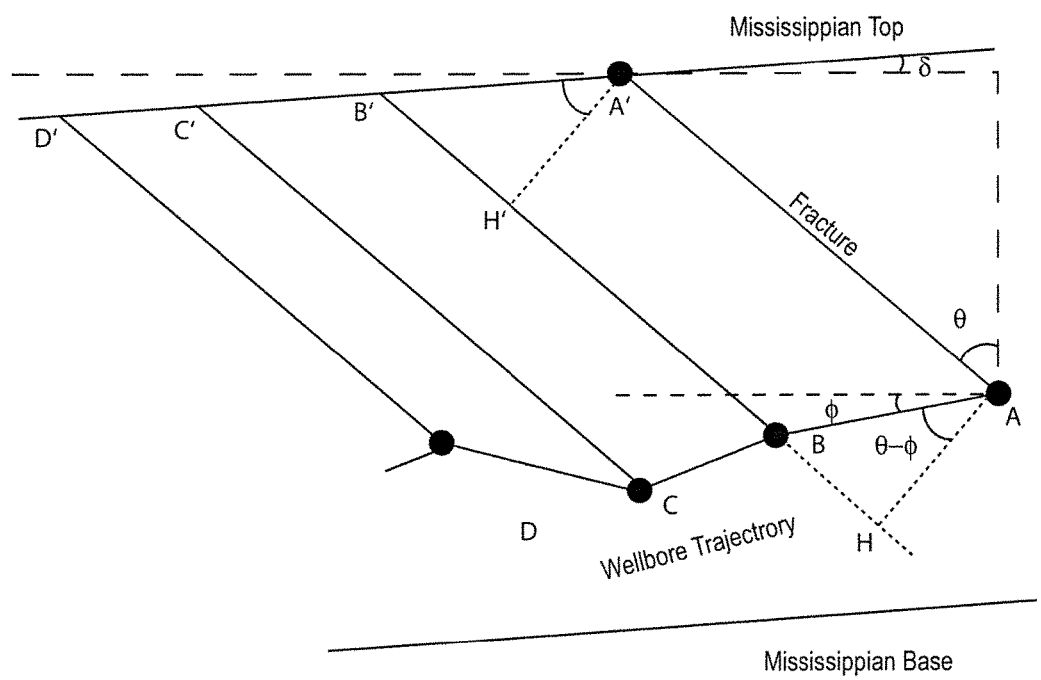
FIG. 9 contains a further illustration of an embodiment of the projection operation.

FIG. 9 contains a further illustration of the above projection method. In this figure the path of the well (A-B-C-D) in the subsurface and within the target formation is assumed to be piecewise linear, although that is not required. In this figure, phi ($\phi$) is the inclination of the well path between A and B, theta ($\theta$) is the measured fracture angle within the well, and delta ($\delta$) is the angle between the target formation (the Mississippian) and the horizontal at a point above the segment of the well that is under consideration. As can be seen, in some embodiments the projection scheme will move through the lateral portion of the well by choosing successive segments which are approximately linear. Within each segment, the calculated fracture density values in an interval will be projected up to the top of the target formation. Now and with respect to FIG. 9, to calculate A'B' in terms of AB, in triangles A'H'B' and AHB, $$A'H' = A'B'^* Cos(\theta - \delta)$$

and, $$AH = AB^* Cos(\theta - \phi).$$

Now, A'H' and AH form sides of a parallelogram to A'H'–AH, thus:

$$A'B' = AB \frac{Cos(\theta - \phi)}{Cos(\theta - \delta)}.$$

By way of specific example, in the fracture density map of FIG. 8 a majority of fractures had steep dips (between 75° and 85°). For example, a fracture intersecting the wellbore with a dip of 85° towards the heel of the well and a distance of 70' to the top of the Mississippian will project the fracture density only 6' along the formation top. This is an insignificant distance when compared to the 4,000 foot length of the lateral section of the wellbore.

Next, various attributes that have been chosen to be predictive of fracture density and that are associated with the target horizon will be calculated from the seismic data. As is described in greater detail below, seismic attributes that have proven to be useful include the amplitude at the target horizon, the instantaneous frequency/phase at the target horizon, the incoherence, and the negative and positive curvature at the target horizon. (See, e.g., the correlations in FIG. 7). As can be seen from the correlation matrix in this figure, there were various degrees of correlation between the selected parameters and the fracture density. There were also some significant positive correlations between the chosen attributes (e.g., the correlation between frequency and amplitude is 0.722) which suggests that one or more of these attributes might be redundant or predictable from the others. That being said, what is important is that the attributes all relate in some physical way to the parameter that is being measured, i.e., the fracture density in this case.

Next, the predictor variables (seismic attributes) will be used in a nonlinear multiple regression to obtain coefficient estimates that can be used to predict fracture density away from the well (discussed more fully below). Given the equations that predict fracture density from the seismic attributes, the equation may be applied to the entire dataset to produce a map of the sort illustrated in FIG. 8, where different levels of fracture density are indicated by the darkness (lightness) of the map. Wells #1 and #2 are indicated to be horizontally drilled with an approximate borehole paths as indicated by the black lines associated with each well. FIG. 2 illustrates relative values of fracture density from a FMI log taken in Well #2. Fracture density is superimposed on the well trajectory in that figure. In this example, the heel of the wellbore has higher fracture density than its toe.

The example that follows is presented in order to make clearer how an embodiment would be implemented in practice and not out of any intent to limit the practice of the invention to the specific parameter choices discussed below.

Step 1: Seismic Interpretation

Seismic data are time series representing a depth profile of the subsurface. Therefore to map the depth structure of subsurface formations, the seismic data should be first reconciled with well logs, which have been taken within a borehole and record much of the same information as seismic but at higher resolution and as a function of depth instead of time. After reconciling the seismic and well logs, information on an individual formation can be extended outwards from the borehole in a 3D seismic volume.

Reconciling well and seismic data is a multi-step process in itself and may involve several simplistic assumptions. According to an embodiment and as a first step, a reflectivity series is generated using the sonic and density well logs according to methods well known to those of ordinary skill in the art. The individual reflectivity coefficient, $R_0$, in the reflectivity series corresponding to the interface between any two rock units is determined from their impedance contrast (impedance is the product of formation velocity, v, and density, ρ). The number and strength of calculated reflectivity coefficients in the reflectivity series is reflected in the rocks sampled in the borehole.

It is well known that a synthetic seismic trace can be calculated by convolving a seismic wavelet with well data, e.g., convolution with reflectivity coefficients obtained from density and velocity logs. This synthetically created trace ("synthetic") represents the seismic data that theoretically would have been recorded during a noise-free seismic acquisition if the source and receiver were located at the borehole itself. The standard polarity convention is to have a trough represent negative reflection coefficients (a high impedance rock overlying a low impedance rock) and peak represent positive reflection coefficients (a low impedance rock overlying a high impedance rock). In the example discussed below, the target rock unit is over- and underlain by low impedance shale layers. As a result, the target horizon top appears as a peak in the seismic volume and the base appears as a trough.

If the seismic data are properly processed and the seismic velocities are correctly estimated in a stacked 2D or 3D volume it is expected that at the well location the synthetic trace generated from the log will show a good correlation with the seismic trace. The correlation can be, and it typically is, improved by manually moving the peaks and troughs of the synthetic trace to align them with similar looking peaks and troughs in the field seismic trace. This process of improving the correlation has a physical consequence; it modifies the formation velocities at the wellbore. Often there will be a trade-off between having a good seismic/synthetic correlation versus how realistic are the modified formation velocities. In the example discussed below, a fairly high correlation (79%) between the seismic and the synthetic was achieved assuming that the confidence in identifying a particular peak or trough as the top/base of a particular formation which was confirmed through coring was very high. The wavelet to generate the synthetic trace was extracted from a seismic data obtained close to the borehole according to methods well known to those of ordinary skill in the art.

After the well-to-seismic tie has been completed, the interval of the seismic trace that encompasses the target horizon at the well will be identified. For purposes of illustration and continuing with the present example, it was determined that a large peak marks the top of the target rock unit indicating strong impedance contrast; it is followed by a weak trough and another weak peak which could represent the internal litho-stratigraphy of the target horizon; and, finally, a large trough marks the interface between the target horizon and the rock unit below. Using the synthetic seismogram, four formations tops could be confidently identified—the top of the target horizon and three others. The top of the target horizon was then depth converted using geostatistical methods.

Step 2: Depth Conversion

One challenge in depth-converting a seismic horizon that has been interpreted in time is the availability of an accurate interval velocity model. In absence of processing velocities or where the processing velocities are not reliable, other approaches might be investigated. For example, where there are several wellbores that are covered by the survey, a statistical relationship between time and depth can be defined with variography. This statistical approach, generally referred to as geostatistics, has been successfully applied in many reservoirs throughout the world. The underlying assumption of variography is that, given a parameter value at two different points, changes in the value of that parameter depends on the separation distance between the two points rather than their spatial location.

Generally, the difference in magnitude of a variable between any two data-pairs increases as the separation between the pairs, referred to as the lag, increases. A model that describes variation for all possible data pairs in a given dataset with respect to lag is known as a variogram. The process of interpolating/extrapolating data using a variogram is known as Kriging. In the instant example, the target horizon depth will be assumed to be known at 350 locations. Given this number of wells in the present example, it should be possible to obtain an adequate estimation of a near continuous target horizon depth surface in the example area through Kriging. The Kriging Work flow (FIG. 1) is as follows: detrending, variogram modeling, neighborhood search, and reincorporation of the trend. Of course, where fewer wells are available other approaches such as the use of seismic velocities from stacking, tomographic cross hole surveys, VSP surveys, etc., would certainly be possible. In some cases a blended approach might be used, i.e., seismic velocities might be combined with those well velocities where such are available.

The data used in the kriging step may and, in some embodiments, should be preconditioned to achieve a normal distribution which can be achieved, in some embodiments, by detrending or extraction of the "background" trend from the data. Detrending also tends to make the data spatially isotropic, i.e., the data variance becomes independent of azimuths. The equation that best estimates background trend is user-defined and would typically be different for different horizons and exploration areas. Those of ordinary skill in the art will be able to choose a functional form to use in detrending so as to produce approximately spatially isotropic data.

In some embodiments, the detrending will be performed by fitting a second order exponential function to the data. The residual data after detrending can be used to create a semivariogram. The semivariogram model in the present embodiment is essentially the best fitting line to a variance cloud.

Continuing with the current example, the semivariogram is a stable function. This function has a monoclinal shape, meaning low variance at near distances which rises sharply and then levels off at the range distance. It is expressed according to this embodiment as:

$$\gamma(h; \theta) = \theta_x \left[ 1 - \exp\left(-3\left(\frac{\|h\|}{\theta_r}\right)\right)^{\theta_e} \right], \text{ for all } h,$$

where $\theta_s \geq 0$, and, $0 \leq \theta_e \leq 2$, $\gamma(h; \theta)$ is the stable function, h is the spatial vector, $\theta_s$ is the partial sill, $\theta_r$ is the range, and $\theta_e$ is the nugget, as those terms are generally understood in the Kriging literature.

Continuing with the present example, a given point in space will typically be located at different distances from preexisting boreholes. The predicted value of a calculated top at a particular location in some embodiments will be a weighted average of predictions from the wells that surround it. The distance from an individual borehole to which the semivariogram is used to predict the depth of the top surface will typically be restricted using a search neighborhood. A multitude of criteria exist for determining the search neighborhood, its shape being the most important. In some embodiments the shape of the search neighborhood will be considered to be isotropic.

As opposed to Kriging where the value of a predicted top depth will generally depends only on its distance from nearest boreholes, in cokriging, the prediction will use the two-way seismic arrival time of the top surface as a guide. The two-way reflection time will serves as a generally dependable guide because it can be correlated to the top depths at the boreholes. In cokriging, independent semivariogram will be constructed for both primary (target horizon top depths at the boreholes) and secondary (target horizon top seismic times) variables which will then be merged to a construct a covariance model. The convariance model can then be used to predict top depths between the boreholes. An isotropic search neighborhood, similar to the one used in kriging, is also defined for cokriging in the instant embodiment.

Step 3: Attribute Extraction

Besides reflectivity, it is well known that attributes of the seismic wavelet such as amplitude, phase and frequency can potentially also provide additional information about rock and fluid types. Generally speaking, seismic attributes fall in two broad categories: geometrical and physical. Geometrical attributes such as coherency examine continuity of traces over a given time/space window and have been routinely used to illuminate subtle faults and fractures, karsts, sinkholes and fluvial systems. Physical attributes, also referred to as complex traces attributes, are related to the physical geological features.

Coherency measures trace-to-trace discontinuity by evaluating local changes in the amplitude. By calculating localized waveform similarity in the in-line and cross-line direction, estimation of three-dimensional seismic coherency can be obtained. Parts of seismic data with low coherency are generally interpreted as a discontinuity in the underlying geology, such as pinchouts, an abrupt facies change, faults and fractures, etc. The coherency seismic volume can also be used as a quality control tool. In some embodiments the coherency attribute will be used to identify the major, large-scale faults in the region.

Another commonly used geometric attribute is curvature, which extends the measurement of discontinuity in 3D to examine local shape change within a cluster of traces. The underlying assumption behind the curvature measure is that a rugged surface can be decomposed into multiple syn- and anticlines which in turn can be visualized as forming arcs of a circle with varying radii. Curvature is defined as the inverse of this radius. As a radius approaches infinity, or the curvature becomes zero, the shape of the interface changes from rigged to flat. Conventionally, K1 has been used to symbolize the most-positive curvature representing the direction and magnitude of concave-down, anticlinal, features. K2 symbolizes the most-negative curvature representing the direction and magnitude of concave-up, synclinal, features. In the present example, the variations in K1 and K2 could not be related to any geological facies although they might be useful in other geologic settings.

An underlying assumption of physical attributes is that the recorded seismic trace (also referred to as the "real" trace) is a projection (the real component) of a complex 3D helical trace. The helical trace, Z(t), is constructed by first computing the imaginary part, Y(t), though Hilbert Transform of the real trace, X(t), and then adding both of them together:

$$Z(t) = X(t) + iY(t)$$

The helical trace can be imagined as a spiral traced by the tip of a vector that constantly progresses in time and rotates about the time axis. The instantaneous amplitude, a(t), is the magnitude of the vector and can be computed as:

$$a(t) = \sqrt{x^2(t) + y^2(t)}$$

In the previous equation, x(t) is the real seismic trace and y(t) is the imaginary trace. The instantaneous phase, θ(t), is the angle between the amplitude vector a(t) and the horizontal plane (which contains the real trace) and computed as:

$$\theta(t) = \tan^{-1}\left(\frac{y(t)}{x(t)}\right)$$

The instantaneous frequency, ω(t), is defined as the rate of change of the phase angle:

$$\omega(t) = \frac{d\theta(t)}{d(t)}$$

For purposes of the instant example, the instantaneous amplitude, phase and frequency were extracted along the top of the target horizon but none of the individual maps could be considered indicative of the fracture density.

Step 4: Fracture Density Prediction Using Multivariate Non-Linear Regression

Multivariate statistics is a technique for analyzing how a response (here, fracture density) variable is related to multiple predictor variables (here, seismic attributes). A linear relation implies proportional changes in response and predictor variables. Likewise, a non-linear relation implies dis-proportional changes. In presence of noise such as in the seismic volume in this presentation, it is difficult to determine exact relation between the response and the predictor variables. The best practice is to regress, i.e, identify a best-fitting line or function with minimum prediction error. In multivariant non-linear regression, relationships can be expressed as:

$$\theta(Y) = \sum_{i=1}^{P} \varphi_i(X_i) + \varepsilon$$

In the previous equation, $\theta$ is a function of the response variable, Y, $\varphi_i$ is a function of the predictor $X_i$, i=, ..., p is the number of predictors and $\varepsilon$ is error. Typically $\varphi_i$ has generic behavior such as might be found in the case of a positive and negative monotonic, multi-order polynomial, or a periodic function. The variables Y and $X_i$, instead of being single valued are maps in for purposes of the present example. Here the term model signifies a combination of the functions $\varphi_i$ and a constant $\varepsilon$. Continuing with the present example, a multivariant model has been developed using well described previously. It has been validated on a different well. Both these wells are lateral and located in a survey where attributes are relatively reliable due to minimal acquisition and processing contamination.

Note that, although an embodiment uses nonlinear regression, that is not an absolute requirement. In some cases linear regression could be used instead, e.g., where the relationship between the selected seismic attributes and the fracture density was approximately linear. All that is required is that a functional relationship be established between the fracture density as projected on the top of the target formation and a plurality of seismic attributes. Whether that relationship is calculated via regression or some other means is immaterial.

In one embodiment, the following equation was obtained and used to predict fracture density from extracted seismic attributes according to the previous equation:

$$fd=0.01+0.32*f^{-1}+0.12*i^{-2}+0.45*e^{-nc}+0.45*e^{pc}+0.11*a^{-1}$$

Where
fd is the normalized facture density;
f is the normalized instantaneous frequency;
i is the normalized incoherency;
nc is the normalized negative curvature;
pc is the normalized positive curvature; and,
a is the normalized amplitude.

Each variable was normalized to lie in the interval −1.75 to +1.75. The limits of normalization, the choice of function and the choice of attributes as dataset dependent and determined in a trial and error manner.

One approach that has been useful in choosing the attributes has been to calculate a number of candidate attributes (e.g., amplitude, phase, energy, curvature, etc.) and plot them one at a time against fracture density. Based on that plot, it should be possible to pick a functional form that best fits that parameter to the density data. For example, the plot of normalized negative curvature against fracture density suggested that an exponential function (e.g., $e^{-nc}$) would match the general shape of the data on the cross plot. Further, to the extent possible, it was desirable to pick attributes that were not highly correlated with each other so that as much as possible each variable made some unique contribution to the prediction equation. This trial and error approach was utilized to chose the predictor attributes used in the previous equation.

The response variable (the fracture density) in the present example was interpreted from the FMI log in the lateral section of the subject well and projected to the top of the target formation as described below. The selected spredictors—amplitude, frequency, K1, K2 and coherency seismic attributes—were extracted along the target top time surface along the vertical projection of Well #2 and were chosen as described above. Much like a well-to-seismic tie, the FMI log in the current example needs upscaling such that the response and predicted variable have the same resolution.

Figure 3:
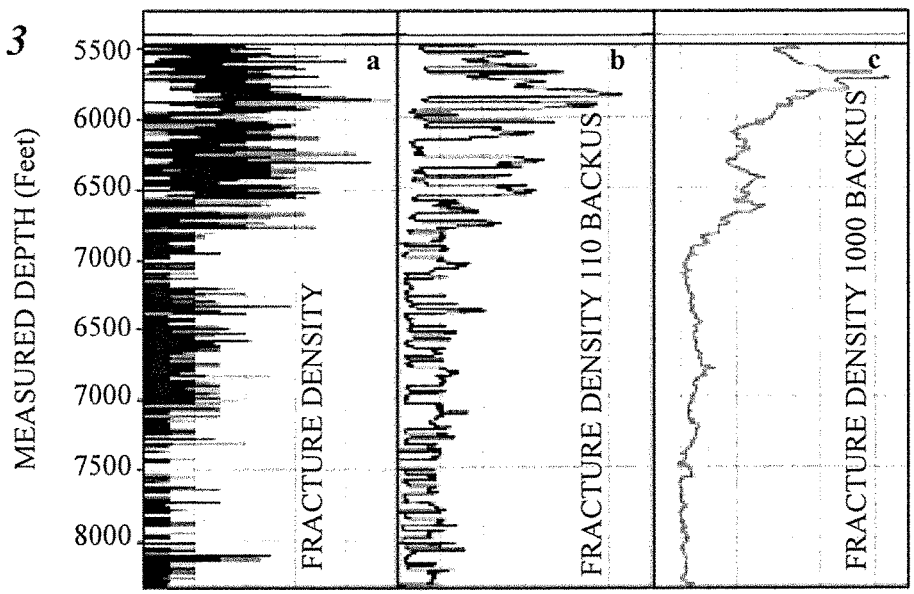
FIG. 3 contains an illustration of FMI upscaling according to an embodiment. Curve (a) has a plot offracture density from an FMI log interpreted every 4 inches along the lateral portion of the same well as FIG. 2. Curve (b) was created by upscaling Curve (a) using a Backus averaging at 110 samples. Curve (c) was created by upscaling Curve (a) using a Backus average of 1000 samples. Curve (c) is one example of a resolution that would be suitable for use with seismic data as described herein.

The FMI tool samples the rocks intervals of about 4 inches. In comparison, the distance between two seismic traces in the volumes is 110 feet. FIG. 3 contains an illustration of FMI upscaling.

In FIG. 3, Curve (a) shows an example of a fracture density curve interpreted every 4 inches along the lateral portion of Well #2. Comparing fractures measured at this scale with seismic is not the best approach as discussed previously. Curve (b) shows an upscaled version of Curve (a) using Backus averaging at 110 samples. Curve (c) shows an upscaled version of the FMI log using Backus average of 1000 samples. This is the resolution of the fracture model which is created using a combination of attributes that is discussed in the example embodiment presented below. Those of ordinary skill in the art will recognize that the Backus averaging is a well known means of upscaling data which is comparable to taking the geometric mean of the data.

Figure 4:
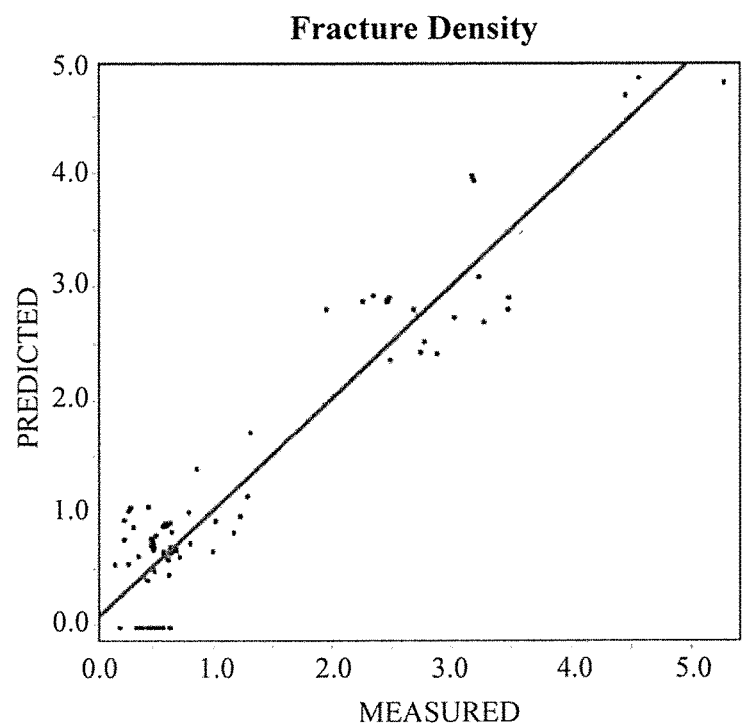
FIG. 4 illustrates an embodiment of a multivariate model output according to the teachings herein. Measured fracture density is plotted along x-axis. Fracture density predicted using the multivariant non-linear regression is plotted along y-axis. Observed and predicted data have a correlation coefficient of 0.945 and $r^2$ of 0.893.

Using the equation calculated previously, FIG. 4 illustrates the Well #2 multivariate model output as compared with the actual fracture density from the FMI log. Measured fracture density is plotted along x-axis. Fracture density predicted using the multivariant non-linear regression is plotted along y-axis. Observed and predicted data have a correlation coefficient of 0.945 and $r^2$ of 0.893.

The cross correlation table of FIG. 7 presents the results of attribute cross correlation. The fracture density is taken along the path of the wellbore in Well #2. They are first projected vertically up to the subject top so that they are consistent with attributes, which that are mapped along a surface. The table of FIG. 7 shows linearity of a single attribute with the rest including fracture density. Higher magnitude indicates better correlation between two attributes. The multivariate model uses attributes as input and outputs fracture density.

With respect to FIG. 7, this table clearly shows that the fracture density does not have a high linear correlation with any individual seismic attribute, indicating that no seismic attribute by itself is a good representation of the fracture density. The data of FIG. 7 also show that the attributes used in multi-variant regression are individually correlated in some cases. However no single attribute has much predictive power as compared with fracture density. Combining the attribute values using a multivariate non-linear regression function produces a predictor of fracture density that is 94% accuracy (FIG. 4).

With respect to FIG. 8, this figures shows a map that contains the predicted fracture density for a seismic dataset that has been analyzed according to the embodiment discussed above. The two horizontally drilled wells used in the example above (Well #1 and Well #2) are shown on the map together with the approximates tracks of their respective well bores as viewed from the surface. The light and dark areas of the map indicate regions of different fracture density.

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

For purposes of the instant disclosure, the term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100.

Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

In the foregoing, much of the discussion has been discussed largely in terms of conventional seismic surveys, but that was done for purposes of illustration only and not out of an intent to limit the application of the instant invention to only those sorts of surveys. Those of ordinary skill in the art will understand how the embodiments presented supra could readily be applied, by way of example, to a 2D line, a 2D grid, a 3D survey, 4D survey, etc., surveys, down hole surveys, VSP surveys, cross hole surveys, or any combination of same. Thus, when a "seismic survey" is mentioned herein, it should be broadly construed to include any of the foregoing.

Further, in the previous discussion, the language has been expressed in terms of operations performed on conventional seismic data. But, it is understood by those skilled in the art that the invention herein described could be applied advantageously in other subject matter areas, and used to locate other subsurface minerals besides hydrocarbons. By way of example only, the same approach described herein could potentially be used to process and/or analyze multi-component seismic data, shear wave data, converted mode data, cross well survey data, full waveform sonic logs, controlled source or other electromagnetic data (CSEM, t-CSEM, etc.), or model-based digital simulations of any of the foregoing. Additionally, the methods claimed herein after can be applied to mathematically transformed versions of these same data traces including, for example: filtered data traces, migrated data traces, frequency domain Fourier transformed data traces; transformations by discrete orthonormal transforms; instantaneous phase data traces, instantaneous frequency data traces, quadrature traces, analytic traces; etc. In short, the process disclosed herein can potentially be applied to a wide variety of types of geophysical time series, but it is preferably applied to a collection of spatially related time series. Thus, when the term "seismic trace" or "trace" is used herein, those terms should be broadly construed to include traditional seismic traces as well as any of the foregoing.

As was mentioned previously, a typical seismic surveys may thought of as consisting of five dimensions, i.e., time (or z), x, y, shot-receiver offset in x, and shot-receiver offset in y. This method taught herein can easily be extended from two dimensions into three, four, five, six, or even more dimensions by those of ordinary skill in the art (e.g., a 6D survey is a prestack time-lapse 3D survey). Using more dimensions typically allows a more accurate and robust method of interpolation, although the computation cost tends to increase with dimensionality.

Still further, additional aspects of the instant invention may be found in one or more appendices attached hereto and/or filed herewith, the disclosures of which are incorporated herein by reference as if fully set out at this point.

Additionally, while this disclosure is susceptible of embodiment in many different forms, there is shown in the drawings, and will herein be described hereinafter in detail, some specific embodiments. It should be understood, however, that the present disclosure is to be considered an exemplification of the principles of the system and method taught herein and is not intended to limit it to the specific embodiments or algorithms so described.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A method of seismic exploration of a region of the subsurface of the earth containing structural or stratigraphic features conducive to the presence, migration, or accumulation of hydrocarbons, wherein is provided a plurality of seismic traces collected in a seismic survey conducted proximate to the region of the subsurface of the earth and at least one FMI well log obtained from a horizontally drilled well proximate to said seismic survey, at least a portion of said FMI well log being within a target formation, said target formation having a top defined by a plurality of depths within the subsurface, the method comprising the steps of:
   (a) within a computer,
      (i) obtaining a plurality of fracture density measurements from said FMI log, thereby producing a fracture density log;
      (ii) accessing said plurality of seismic traces from said seismic survey;
      (iii) identifying said target formation top within each of said accessed plurality of seismic traces, thereby producing a picked time within each of said accessed plurality of seismic traces;
      (iv) using said picked time associated with each of said accessed plurality of seismic traces and said plurality of depths defining said target formation to adjust said picked time of said each of said seismic traces to match a corresponding depth of said formation top;
      (v) projecting said at least a portion of said fracture density log onto said formation top along a fracture dip direction, thereby obtaining formation density estimates along said formation top;
      (vi) calculating a plurality of different seismic attributes for each of said accessed plurality of seismic traces from seismic data proximate in depth to said target formation top;
      (vii) using said calculated plurality of different seismic attributes for each of said accessed plurality of seismic traces and said formation density estimates along said formation top to obtain a prediction equation that relates said plurality of seismic attributes to said fracture density estimates along said formation top; and,
      (viii) using said prediction equation and at least a portion of said seismic survey to predict fracture density away from said horizontally drilled well;
   (b) making an exploration or production decision based on said predicted fracture density away from said horizontally drilled well.

2. The method according to claim 1, wherein step (vii) comprises the step of using said calculated plurality of different seismic attributes for each of said accessed plurality of seismic traces and said formation density estimates along said formation top to calculate a prediction equation using nonlinear regression that relates said plurality of different seismic attributes to said fracture density estimates along said formation top.

3. The method according to claim 1, wherein step (iv) comprises the steps of:
   (1) obtaining a plurality of subsurface velocity estimates proximate to said accessed plurality of seismic traces; and
   (2) using said picked time associated with each of said accessed plurality of seismic traces, said plurality of subsurface velocity estimates and said plurality of depths defining said target formation to adjust said picked time of said each of said seismic traces to match a corresponding depth of said formation top.

4. The method according to claim 3, wherein said subsurface velocity estimates are selected from a group consisting of seismic stacking velocity estimates and well log derived velocity estimates.

5. The method according to claim 1 wherein said plurality of different seismic attributes are selected from the group consisting of an amplitude at said target formation top, an instantaneous frequency at said target formation top, an instantaneous phase at said target formation top, an incoherence at said target formation top, a negative curvature at said target formation top, and a positive curvature at said target formation top.

6. A method of exploration of a region of the subsurface of the earth, wherein is provided a plurality of seismic traces collected in a seismic survey conducted proximate to the region of the subsurface of the earth and a fracture density log obtained from a horizontally drilled well proximate to said seismic survey, at least a portion of said fracture density log being within a target formation, said target formation having a top defined by a plurality of depths within the subsurface, the method comprising the steps of:
   (a) within a computer,
      (i) accessing said fracture density log;
      (ii) accessing said plurality of seismic traces from said seismic survey;
      (iii) identifying said target formation top within each of said accessed plurality of seismic traces, thereby producing a picked time associated with each of said accessed plurality of seismic traces;
      (iv) using said picked time associated with each of said accessed plurality of seismic traces and said plurality of depths defining said target formation to adjust said picked time of said each of said seismic traces to match a corresponding depth of said formation top;

(v) projecting said at least a portion of said fracture density log onto said formation top along a fracture dip direction, thereby obtaining formation density estimates along said formation top;

(vi) calculating a plurality of different seismic attributes from said depth adjusted seismic data;

(vii) using said calculated plurality of different seismic attributes for each of said accessed plurality of seismic traces and said formation density estimates along said formation top to obtain a prediction equation that relates said plurality of seismic attributes to said fracture density estimates along said formation top; and (viii) using said prediction equation and at least a portion of said seismic survey to predict fracture density away from said horizontally drilled well;

(b) making an exploration or production decision based on said predicted fracture density away from said horizontally drilled well; and (c) drilling a well based on said exploration or production decision.

7. The method according to claim 6, wherein step (vii) comprises the step of using said calculated plurality of different seismic attributes for each of said accessed plurality of seismic traces and said formation density estimates along said formation top to calculate a prediction equation using nonlinear regression that relates said plurality of different seismic attributes to said fracture density estimates along said formation top.

8. The method according to claim 6, wherein step (iv) comprises the steps of:

(1) obtaining a plurality of subsurface velocity estimates proximate to said accessed plurality of seismic traces; and (2) using said picked time within each of said accessed plurality of seismic traces, said plurality of subsurface velocity estimates proximate to said accessed plurality of seismic traces associated with each of said accessed plurality of seismic traces and said plurality of depths defining said target formation to adjust said picked time of said each of said seismic traces to match a corresponding depth of said formation top.

9. The method according to claim 8 wherein said subsurface velocity estimates proximate to said accessed plurality of seismic traces are selected from the group consisting of stacking velocity estimates and well log derived velocity estimates.

10. The method according to claim 6, wherein each of said plurality of depths defining said top of said target formation is spaced apart from the other, and wherein step (iv) comprises the steps of:

(A) using Kriging or Cokriging to interpolate between each of said plurality of spaced apart depths defining said target formation top to form a depth map of said top of said target formation, and (B) using said picked time associated with each of said accessed plurality of seismic traces and said depth map of said top of said target formation to adjust said picked time of said each of said seismic traces to match a corresponding depth of said formation top.

11. The method according to claim 6, wherein said plurality of different seismic attributes are selected from the group consisting of an amplitude at said target formation top, an instantaneous frequency at said target formation top, an instantaneous phase at said target formation top, an incoherence at said target formation top, a negative curvature at said target formation top, and a positive curvature at said target formation top.

* * * * *